United States Patent
Kennedy

[11] Patent Number: 5,803,139
[45] Date of Patent: Sep. 8, 1998

[54] PRESSURIZED OZONE DISINFECTED WATER DELIVERY SYSTEM AND METHOD

[76] Inventor: Kirk R. Kennedy, 1226 San Angelo Dr., Salinas, Calif. 93901

[21] Appl. No.: 874,522

[22] Filed: Jun. 13, 1997

[51] Int. Cl.⁶ ........................................................ B65B 3/04
[52] U.S. Cl. ........................ 141/231; 210/192; 210/241.1; 210/257.1
[58] Field of Search ................................... 141/1, 231, 2, 141/18, 98; 210/760, 192, 241.1, 257.1

[56] References Cited

U.S. PATENT DOCUMENTS

| | | | |
|---|---|---|---|
| 3,326,747 | 6/1967 | Ryan et al. | 167/17 |
| 3,823,728 | 7/1974 | Burris | 137/88 |
| 4,359,073 | 11/1982 | De Stoutz | 141/231 |
| 4,871,452 | 10/1989 | Kohler et al. | 210/241 |
| 5,151,197 | 9/1992 | Smith et al. | 210/758 |
| 5,256,307 | 10/1993 | Bachhofer et al. | 210/709 |
| 5,268,300 | 12/1993 | Latura et al. | 210/241 |

*Primary Examiner*—J. Casimer Jacyna
*Assistant Examiner*—Steven O. Douglas
*Attorney, Agent, or Firm*—Flehr Hohbach Test Albritton & Herbert LLP

[57] ABSTRACT

A water delivery system (70) including a multiplicity of water dispensing systems (10), each including a water storage reservoir (12), a feed line (14), and a faucet (16), and a mobile, re-supply truck (30). Truck (30) includes a water tank (32), a water pump (34), and an ozone generator (36). Water dispensing systems (10) are installed at remote, on-site locations, such as for example residential homes and offices, and re-supply truck (30) services the dispensing systems (10) by delivering water from a water source (72) to each system. Each dispensing system (10), including its storage reservoir (12) is a closed, high pressure system, preferably at approximately 15 psi, so that power necessary to delivery water, on demand, from a storage tank (12) to a faucet (16) is provided by the system pressure.

12 Claims, 4 Drawing Sheets

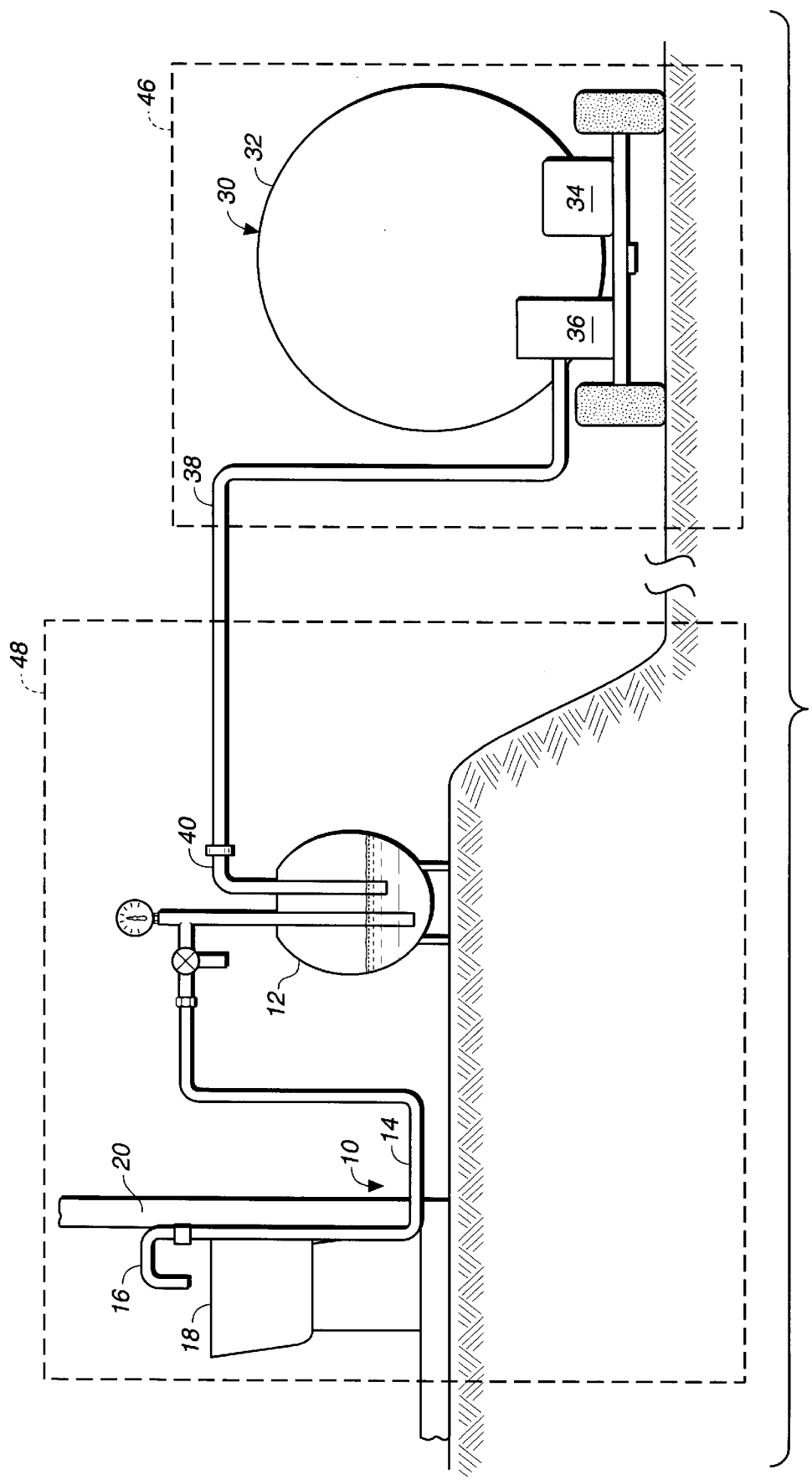
FIG._1

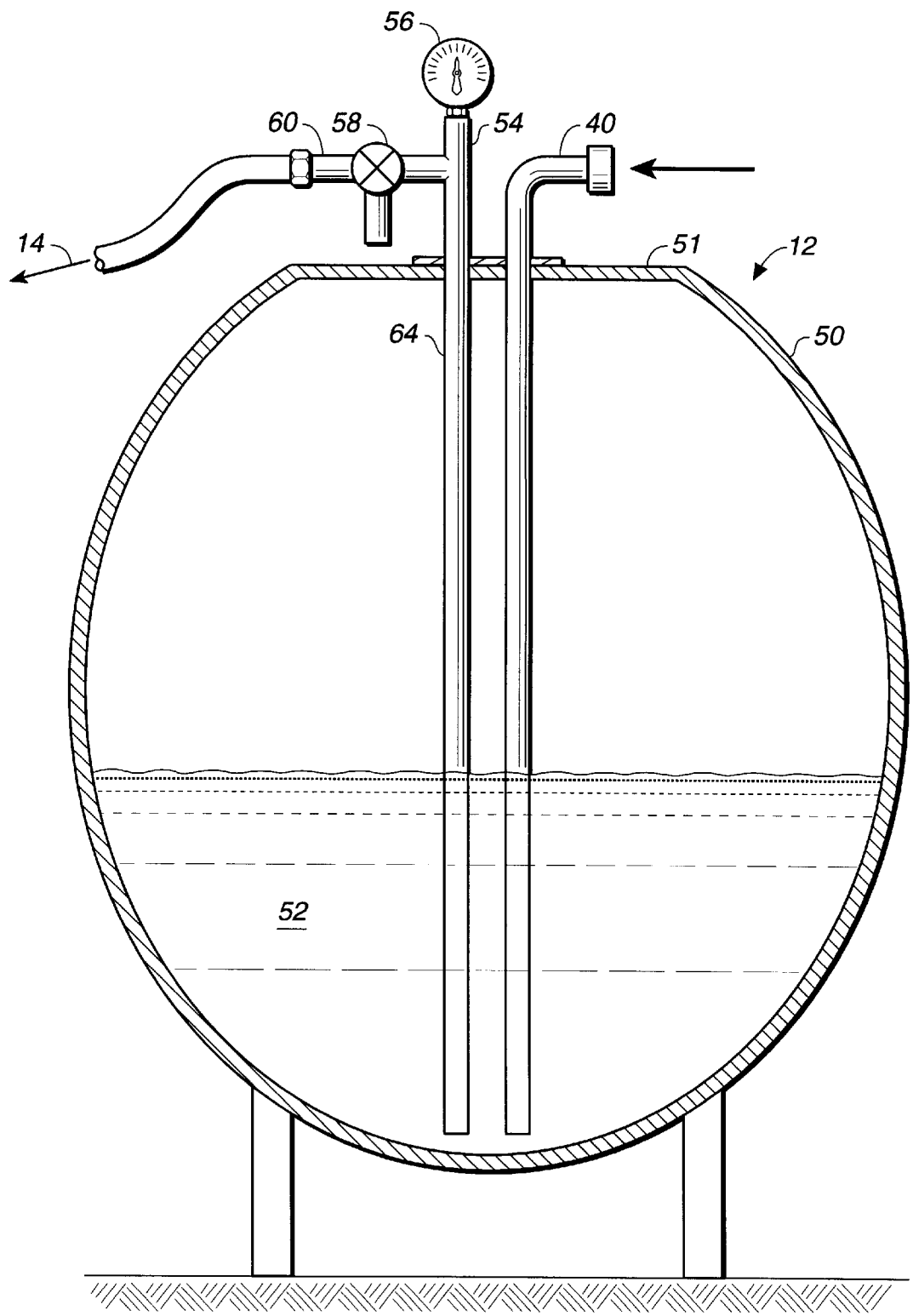
FIG._2

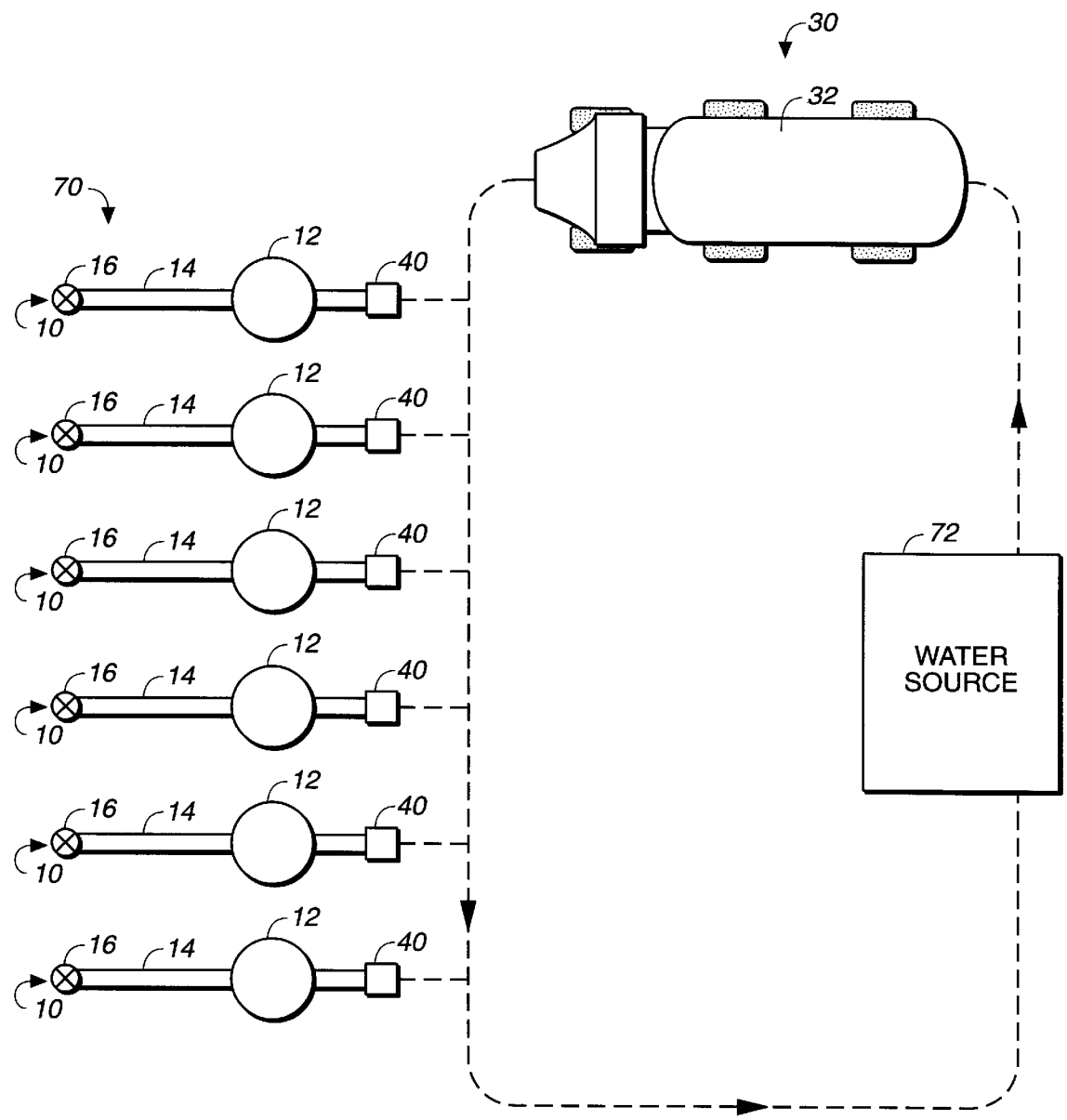
FIG._3

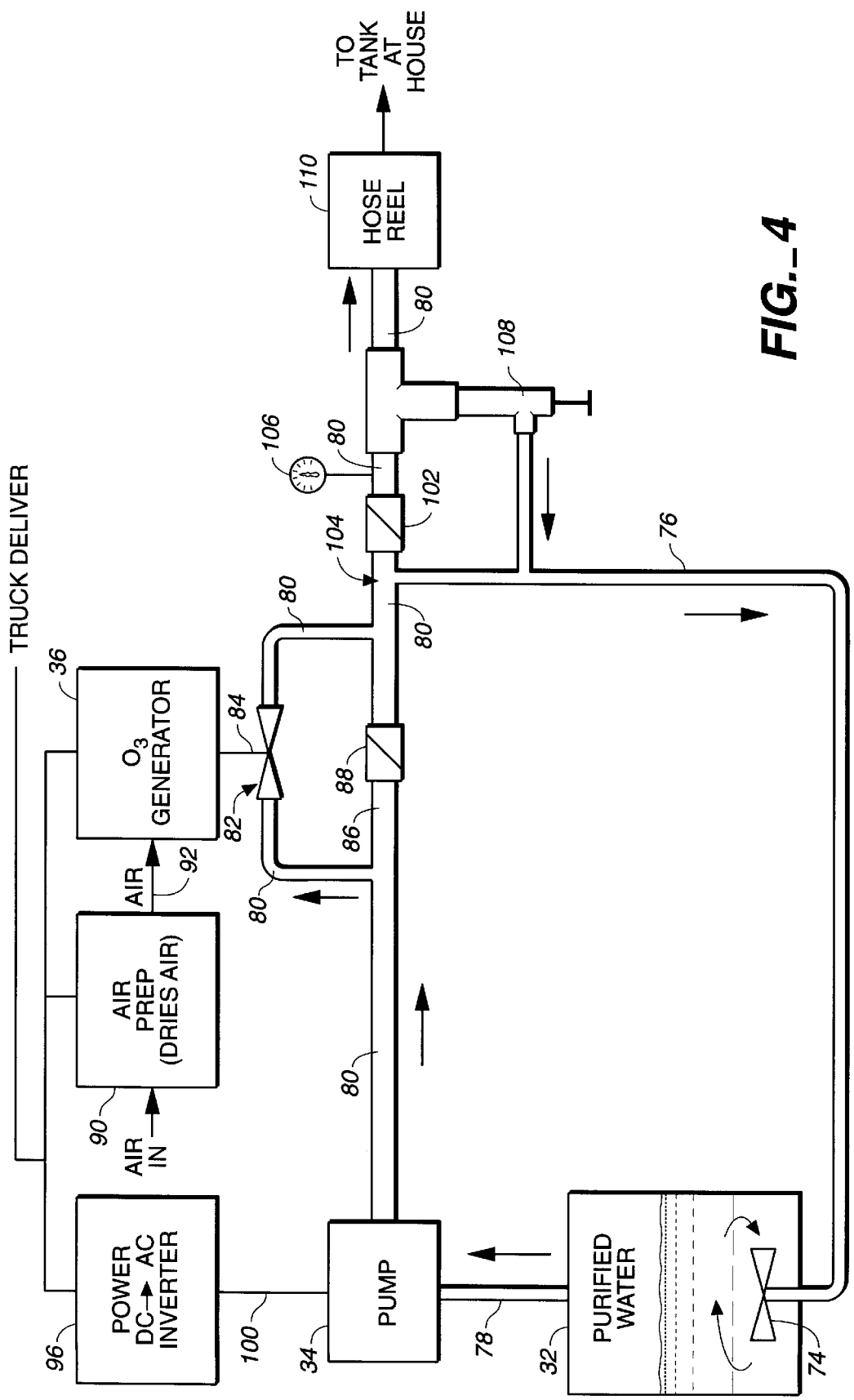
FIG._4

PRESSURIZED OZONE DISINFECTED WATER DELIVERY SYSTEM AND METHOD

TECHNICAL FIELD

This invention pertains to water dispensing systems and, more particularly, to ozone treated water dispensing systems for home or commercial use.

BACKGROUND ART

The purified water market is growing rapidly in the United States as more and more natural water sources become contaminated or foul tasting and consumer demand increases for clean, healthy and good tasting potable water. Concomitant with the growing purified water market is expanding competition in this market, which is causing price pressures to increase. While consumers have shown a willingness to pay a premium for good quality water, market analysis suggests that there are limits to what consumers will pay. As a result, bottled water suppliers have found that there is a limited price range within which they can sell their product.

Currently, there are several markets for purified water, including bottled water sold in one gallon or smaller containers, and two and one half, and five gallon containers sold at retail stores or delivered to home or office, and water supply stores wherein a customer may bring in their own bottle of any size and fill it with purified water. Other specialized markets exist as well. One of the problems associated with these solutions for providing consumer-ready purified water is the multitude of waste bottles generated, especially individual size bottles. While many bottled water containers can be recycled, recycling options vary from county to county, and for many plastic water bottles there is a limit to the number of times that certain types of plastic bottle material can be recycled.

Another problem that exists with individual and non-delivered two and one half and five gallon containers is the hassle of carrying these bottles from a store back home or to work. Large water containers are difficult to store and handle, mainly due to their weight. A filled five gallon water bottle weighs approximately 43 lbs. In addition, with all five gallon water bottles, non-delivered and delivered, there is the associated hassle of having to mount the bottle onto a dispensing spigot, which requires lifting, inverting and positioning the 43 lb. container.

To avoid the inconvenience and wastefulness of water bottles, water filters provide a viable alternative. Carbon and sediment filters are used for water containers and in refrigerators and are relatively inexpensive. Reverse osmosis (RO) filters can be installed at faucets, but are relatively expensive. Other types of filters are used as well, but one of the problems with these filters, as well as with carbon, sediment, and RO type filters, is their inability to eliminate all contaminates. For example, sediment filters do not eliminate herbicides, pesticides or PCB's; carbon filters do not eliminate bacteria, algae, mercury, or lead; and RO filters do not eliminate nitrates, sulfides, or viruses. In their book *California's Threatened Environment—Restoring the Dream,* The Planning and Conservation League Foundation summarized the quality of California's surface water (which provides the vast majority of drinking water to urban areas) as follows:

Discharge of toxic agricultural wastewater is widespread throughout California from the Feather River to the New River. The failure of the Clean Water Act and state laws to control the discharge of agricultural wastes is well documented. Industrial, municipal, and logging/lumber industry sources are also known to discharge metals, organics, oil, and grease. What is surprising, however, is the extent and severity of contamination resulting from metals such as mercury, lead, copper, and chromium leaching from abandoned mines. From the Eel River to the Salinas River, abandoned mines continue to contaminate rivers and lakes.

Chapter 7, pg 124; Edited by Tim Palmer, Island Press, 1993. As the contaminant level in water supplies increases, the inability of water filters to eliminate all contaminants further reduces their efficacy and, thus, their desirability as a viable alternative to bottled water.

In addition, water filters require either regular cleaning or periodic replacement. For example, carbon filter cartridges have to be periodically changed and RO filter membranes require regular flushing and cleaning. Failure to maintain a filter can quickly and completely destroy its ability to properly purify water, as well as increase the contaminant level beyond its original levels. In fact, defective filters can also be a health hazard. Also, RO filters utilize a water storage bladder that often imparts an undesirable taste to the water, which significantly lessons the desirability of such filters due to basic consumer demand for good tasting water.

U.S. Pat. No. 3,823,728 discloses an on-site, potable water dispensing system that utilizes an ozone generator to sanitize water prior to dispensing. In this system, a water pump delivers water from a supply source to a treatment tank, from which water is dispensed on demand through a distribution line. The water is delivered by the water pump into the top of the treatment tank. At the bottom of the tank, an ozone supply line introduces ozone from an ozone generator into the tank. Water is dispensed from the treatment tank presumably by gravity into the distribution line. As water is dispensed from the treatment tank, the water pump simultaneously resupplies the tank with water and the ozone generator pumps in ozone. The ozone mixes with the water previously introduced into the treatment tank as well as with the newly resupplied water. Thus, all water moving through the treatment tank is subject to ozone purification.

While the dispensing system of the '728 patent provides a reliable source of sanitized, ozonated water, it does so at a price that greatly increases cost of the water and, thus, limits its wide-spread application. The disclosed system requires an on-site water pump and ozone generator, both of which are costly components as compared to the cost of a gallon of purified water. The water pump and ozone generator also require a separate power supply, which adds to the installation and operating cost of the system. For some applications, the disclosed system works fine, but for many home and office applications, the overall costs and expenses of such a system are significantly above that which consumers or businesses are generally willing to pay for potable water.

People desire clean, healthy, potable water, and if they cannot get it from the tap, then they desire as little inconvenience, hassle, and expense as possible to obtain it. In addition, people are becoming more and more conscious of the environmental consequences of throw-away containers and are desiring to recycle more as well as generate less waste. Also, the legislative trend in the United States is requiring a reduction in solid waste quantities disposed of in landfills.

Accordingly, it is an object of the present invention to provide readily available purified or otherwise healthy and good tasting water at an affordable price. It is also an object of the present invention to provide purified water in a manner that is convenient to use and yet does not add to the solid waste disposal problem.

DISCLOSURE OF INVENTION

Briefly described, the present invention comprises a system for supplying readily available potable water to numerous on-site water dispensing systems. The delivery system of the invention includes a multiplicity of water storage reservoirs at remote on-site locations, each for storing water at an elevated pressure above atmosphere yet below the pressure level requiring governmental certification and inspection of pressure vessels. With each storage reservoir, a pressurized dispensing system is provided for delivering water from the storage reservoir to a convenient dispensing point, such as a kitchen faucet. The system further includes a mobile water source for re-supplying potable water to each storage reservoir at an elevated pressure. The pressurized water in each storage reservoir provides power necessary to deliver water from the storage reservoir to the dispensing point, thereby eliminating the need for a separate power source at each storage reservoir to dispense water. The system also includes an ozone generator mobile with the water source for injecting ozone into the water prior to delivery of the water to each storage reservoir. With the system of the present invention, a single ozone generator and water pump can be carried on a mobile unit and utilized to re-supply sanitized water to the storage reservoirs on a periodic basis.

An important advantage of the system of the present invention is its simplicity and lost cost. Users of the system only require an on-site storage reservoir, dispensing line, and faucet, and the expense of the storage reservoir is minimized because the system operates below 14 psi pressure, which is the limit for pressure vessels that do not require governmental certification and inspection. The expensive components of the system, the water pump and ozone generator, are carried on a mobile re-supply truck. Thus, a single water pump and ozone generator can periodically service a multiplicity of water storage reservoirs.

In addition, the on-site dispensing systems are pressurized, closed systems. The pressure in each reservoir provides power necessary to dispense water at the faucet and the fact that the system is closed reduces sanitation problems and virtually eliminates maintenance. Properly ozonated water is all that is necessary to sanitize the water in the closed water dispensing systems. The taste of the water is also improved by addition of the ozone.

According to an aspect of the invention, the storage reservoir is substantially spherical, so that the storage reservoirs can be made from a less expensive material, such as polyethylene, yet still retain sufficient structural strength to withstand 14 psi pressure within the storage reservoir. With polyethylene, costs are significantly reduced, but more importantly, safety is enhanced. Polyethylene is durable, but should a crack or stress point develop, the result is usually a pin-hole rather than a catastrophic failure of the reservoir. A reservoir with a pin-hole results in a harmless venting of air and is easily replaced.

According to another aspect of the invention, friction losses in the dispensing system for each storage reservoir are negligible. This is achieved by use of flexible conduit that is installed in a manner eliminating sharp elbows in the conduit, and by use of a nozzle or faucet with a low pressure differential valve. By reducing friction losses, the pressure head in the storage reservoir remains sufficient to extract 80–90% of the water from the reservoir.

According to another aspect of the invention, each storage reservoir includes a nozzle for spraying the ozone-injected water against the inside walls of the storage reservoir as the water is introduced into the storage reservoir, in order to coat the inside walls with the water and thereby provide a degree of sanitation to areas within the storage reservoir that do not regularly contact the water. The spray nozzle is not necessary due to the closed, pressurized nature of the system, but can be provided as an added safety measure if desired.

The present invention also comprises a method for supplying readily available potable water to a multiplicity of stationary water storage reservoirs at remote locations. Each storage reservoir is designed to carry a supply of water at an elevated pressure above atmosphere yet below the pressure level requiring governmental certification and inspection of pressure vessels. Each storage reservoir dispenses water to a convenient dispensing point in close proximity to the reservoir. The pressurized water in each storage reservoir provides power necessary to deliver water from the storage reservoir to the dispensing point, thereby eliminating the need for a separate power source at each storage reservoir to dispense water. Potable water is re-supplied at an elevated pressure to each storage reservoir by means of a water pump that pumps water from a mobile water source to each storage reservoir. The water from the mobile water source is oxidized prior to delivery of the water to each storage reservoir by injecting ozone into the water from an ozone generator mobile with the water source. The ozone generator and water pump are transported on a mobile unit to each of the storage reservoirs in order to re-supply sanitized water to the storage reservoirs on a periodic basis.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic diagram of a water dispensing system and re-supply truck of the water delivery system present invention;

FIG. 2 is a schematic diagram of a storage reservoir of the system of FIG. 1 being refilled with water;

FIG. 3 is a schematic diagram of the water delivery system of the present invention; and FIG. 4 is a schematic diagram of the re-supply mobile unit of the system of FIG. 3.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 1, the water delivery system of the present invention includes an on-site water dispensing system 10, which is comprised of a storage reservoir 12, a dispensing or feed line 14 leading from storage reservoir 12, and a faucet 16 located at a convenient dispensing point. As shown, faucet 16 is installed over a kitchen sink 18 that is located in a residential home 20. Other suitable installations for dispensing system 10 are industrial sites, commercial office space, restaurants, schools, and any other location desiring a readily available source of clean, healthy water.

Storage reservoir 12 is installed at a convenient location in close proximity to faucet 16. For a residential home, such a convenient location may be a garage or storage room. There is a limitation on the distance that storage reservoir 12 can be installed from faucet 16. As discussed later, the pressure in storage reservoir 12 provides the force necessary to move water from the storage reservoir to the faucet. No additional pump is provided to deliver water from the storage reservoir. Storage reservoir 12 operates at pressures less than approximately 15 psi. Thus, there is up to 15 psi pressure in the closed dispensing system 10 to move water. Frictional losses and the pressure head between the storage reservoir and the faucet need to be minimized in order to maintain sufficient pressure at the faucet to deliver water. Accordingly, sharp elbows in feed line 14 should be eliminated, and the height difference between storage reservoir 12 and faucet 16 should be minimized, or storage reservoir 12 can be positioned higher than faucet 16, if possible. Also, faucet 16 should be a low pressure difference faucet, unlike conventional faucets, which are designed to significantly reduce pressure at their outlets. A Model #350 CP faucet available from Chicago Faucets, Des Plaines, Ill., USA has been found to work well with the system of the present invention.

The water delivery system of the present invention also includes a mobile re-supply truck 30. Truck 30 includes a water supply tank 32, a water pump 34, an ozone generator 36, a supply hose 38, and is discussed in more detail with reference to FIG. 4. Supply hose 38 connects up to an inlet fitting 40 on storage reservoir 12. Water is re-supplied by truck 30 before the water level in reservoir 12 gets to the point where there is insufficient pressure in the reservoir to deliver water to faucet 16. In a typical installation, reservoir 12 holds 100 gallons of water, is filled with 50 gallons, to create 15 psi pressure in the reservoir, and the reservoir is re-supplied before the water volume drops below approximately 5–10 gallons. Alternatively, a water level sensor and alarm can be provided in reservoir 12 to indicate when the water volume drops to a level requiring re-supply.

In FIG. 1, re-supply truck 30 is indicated by reference numeral 46 as a mobile water source, and water dispensing system 10 is indicated by reference numeral 48 as a fixed, remote on-site water supply. As will be discussed later, the water delivery system of the present invention includes a multiplicity of remotely located on-site water supplies and a single re-supply truck for servicing the on-site water supplies.

The present invention is not meant to be limited to any particular type of water or to any particular purpose for the water. Ideally, steam-distilled water is used for drinking water purposes, but water purified by reverse osmosis, or obtained from a natural, fresh water source could also be used for providing drinking water. Other additional uses of the water delivery system include water for cooking, cleaning, and showering.

Ozone generator 36 provides a sanitary environment for the water as it is pumped into storage reservoir 12. The ozone not only sanitizes the new water being supplied to reservoir 12, but it also re-sanitizes the unused water remaining in reservoir 12. Charging the water with ozone also helps compensate for vapor loss in the storage reservoir due to air within the tank becoming water logged. Additionally, ozone is thought by many to improve the taste of drinking water.

In FIG. 2, storage reservoir 12 is shown in greater detail. Storage reservoir 12 includes a substantially spherical plastic container 50 that is designed to hold a substantial quantity of purified water 52. The top surface of container 50 is flattened, as indicated by reference numeral 51. Storage reservoir 12 also includes an inlet fitting 40, which is mounted along the flat top 51 of container 50 and connects to the supply hose of the re-supply truck. Storage reservoir 12 also includes an outlet fitting 54, which is also mounted on flat top 51 and connects to the feed line of the dispensing system. A pressure gauge 56 is provided at outlet fitting 54 to indicate the pressure within the closed system of container 50. A recirculation valve 58 is connected between outlet fitting 54 and a coupling 60 for connecting to the feed line 14. Valve 58 is provided to allow for recirculating water back to the re-supply truck, which may be necessary to re-charge the water with ozone. Storage reservoir 12 also includes a draw tube 64, which extends from outlet fitting 54 down into container 50 to a point adjacent the bottom of the reservoir. Water is supplied to container 50 through inlet fitting 40 and is drawn out of container 50 up through draw tube 64 and through outlet fitting 54.

Storage reservoir 12 is preferably made of a lightweight, durable structural plastic material, such as polyethylene. Polyethylene was chosen because it is relatively inexpensive, yet has sufficient strength to withstand 15 psi pressure. 15 psi is selected as the maximum pressure for storage reservoir 12 due to government regulations requiring certification and inspection of pressure vessels operating at pressures greater than 15 psi. An example of such a government regulation can be found in California Labor Code §7624, ¶(e).

Another reason polyethylene was chosen as the material for storage reservoir 12 is because it tends to minimize the effects of a crack developing. While polyethylene is durable and should last at least 7 years before significantly fatiguing, cracks may develop during the useful life of the storage reservoir. When polyethylene develops a stress crack, it tends to develop the crack along a contour of the reservoir or at a surface point. For example, with the storage reservoir of the present invention, the top portion of the reservoir is flat, to accommodate the inlet and outlet fittings. The junction of the flat, top portion and the spherical body of the reservoir creates a contour line, which is the surface point where stress forces are greatest and the point most likely to develop a crack. When polyethylene develops a crack, the stress forces tend to converge to a point rather than diverge and spread as cracks in glass tend to do. If the stress forces are great enough, the result is a pin hole that causes an air leak and loss of pressure, which can easily be corrected by sealing the leak or replacing the reservoir. Preferably, any contour lines or surface points are at a level above the water line, to ensure that a crack does not cause a water leak.

In FIG. 3, the water delivery system of the present invention is schematically shown in its entirety, and is designated as reference numeral 70. The system comprises a multiplicity of water dispensing systems 10, which are installed at remote locations, such as for example residential homes and offices. The inlet fitting 40 for each storage reservoir 12 is adapted to couple with the water supply hose of re-supply truck 30. A single re-supply truck, outfitted with a 1000 gallon water tank, water pump and ozone generator, can service approximately 20–25 remote sites per day. A larger truck, or more than one truck, could of course service more remote sites. The size of storage reservoirs 12 in relation to water tank 32 on re-supply truck 30 is the controlling factor in determining the number of sites serviceable by one truck.

Water delivery system 70 works in conjunction with a water source 72, which may for example be a water purifying facility or a natural clean water source. Re-supply truck 30 periodically services each dispensing system 70 either according to a pre-designed schedule or in response to a specific demand for additional water. A specific demand system may include appropriate water level sensors and an alarm or indicator.

In FIG. 4, a schematic diagram of the water delivery system of re-supply truck 30 shows that water tank 32 includes an ejector/agitator nozzle 74 connected to an ozone inlet line 76, which leads from ozone generator 36. Nozzle 74 directs ozone into water tank 32 in a manner that distributes ozone throughout the tank, in order to charge or re-charge all the water in the tank prior to pumping the water to a remote dispensing system. An outlet hose 78 is connected between water tank 32 and water pump 34. A high pressure line 80 leads from pump 34 to a venturi meter 82, which is in fluid communication with ozone generator 36 via line 84. A bypass line 86 and flow control valve 88 are connected in parallel with venturi meter 82. Flow control valve 86 controls the flow of water through venturi meter 82 and, thus, controls the amount of ozone drawn from generator 36.

Ozone generator 36 may, for example, be an Ozotech 0Z8PC20 available from Ozotech Co., Yreka, Calif., USA. Ozone generator 36 is connected to and communicates with an air preparation device 90, which filters and dries outside air for use by generator 36. Air preparation device or air preparer 90 may, for example, be an Ozotech Power Prep 66. An air line 92 connects air preparer 90 with generator 36. A power invertor 96 provides appropriate electric current to power air preparer 90, ozone generator 36 and water pump 34, via power lines 98, 100.

A water supply on/off valve 102 is provided downstream of the junction 104 of ozone inlet line 76 and high pressure line 80. A pressure gauge 106 is provided downstream of on/off valve 102, and a pressure relief valve 108 is provided downstream of pressure gauge 106 and is also connected with line 76. Excess pressure in both high pressure line 80 or ozone inlet line 76 is relieved by relief valve 108. High pressure line 80 takes the form of a flexible hose after relief valve 108 and is wound around a hose reel 110, which provides easy extension of high pressure line 80 to the inlet fitting of a water storage reservoir.

The water supply system shown in FIG. 4 works in conjunction with the storage reservoir of each remote dispensing system to provide a supply of pressurized water to the storage reservoir. The storage reservoir and dispensing system of each remote system is sealed to maintain a high operating pressure and thereby ensure delivery of water from the storage reservoir to the faucet. Pressurizing the on-site dispensing systems eliminates need for individual ozone generators and water pumps and, thereby, allows for the provision a single ozone generator and water pump on each re-supply truck. This greatly simplifies the dispensing systems, which substantially reduces their installation and maintenance costs, and thereby makes it possible to provide readily available and hassle free purified water at a reasonably competitive cost.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A system for supplying readily available potable water, comprising a multiplicity of water storage reservoirs at remote locations, each for storing water at an elevated pressure above atmosphere yet below the pressure level requiring governmental certification and inspection of pressure vessels, a dispensing system for each storage reservoir for delivering water from the storage reservoir to a convenient dispensing point, a mobile water source for re-supplying potable water to each storage reservoir at an elevated pressure, wherein the pressurization of water in each storage reservoir enables delivery of water from the storage reservoir to the dispensing point, thereby eliminating the need for a separate power source at each storage reservoir to dispense the water, and an ozone source mobile with the water source for sanitizing the pressurized water by injecting ozone into the water prior to delivery of the water to each storage reservoir, wherein a single ozone generator and water pump can be carried on a mobile unit and utilized to re-supply sanitized water to the storage reservoirs on a periodic basis.

2. The system of claim 1 wherein, each storage reservoir is substantially spherical, so that the storage reservoirs can be made from a material having less strength than would be required for a non-spherical shape, yet still retain sufficient structural strength to withstand 15 psi pressure within the storage reservoirs.

3. The system of claim 1 wherein, the friction losses in the dispensing system for each storage reservoir are negligible.

4. The system of claim 3 wherein, the dispensing system for each storage reservoir includes a supply line that does not have any sharp elbows or restrictions creating significant friction loss.

5. A method for supplying readily available potable water, comprising the steps of providing a multiplicity of stationary water storage reservoirs at remote locations, each with a supply of water at an elevated pressure above atmosphere yet below the pressure level requiring governmental certification and inspection of pressure vessels, dispensing water from each storage reservoir to a convenient dispensing point, wherein the pressurized water in each storage reservoir provides power necessary to deliver water from the storage reservoir to the dispensing point, thereby eliminating the need for a separate power source at each storage reservoir to dispense the water, re-supplying potable water at an elevated pressure to each storage reservoir by means of a water pump that pumps water from a mobile water source to each storage reservoir, and oxidizing the water from the mobile water source prior to delivery of the water to each storage reservoir by injecting ozone into the water from an ozone generator mobile with the water source, and transporting the ozone generator and water pump on a mobile unit to each of the storage reservoirs in order to re-supply sanitized water to the storage reservoirs on a periodic basis.

6. The method of claim 5 wherein, each storage reservoir is substantially spherical, so that the storage reservoirs can be made from a less expensive material yet still retain sufficient structural strength to withstand 15 psi pressure within the storage reservoirs.

7. The method of claim 6 wherein, the water is dispensed with minimal friction losses between each storage reservoir and dispensing point.

8. The method of claim 7 wherein, the water of each storage reservoir is dispensed in a dispensing system that includes a supply line that does not have any sharp elbows or restrictions creating significant friction loss.

9. A system for supplying readily available potable water, comprising a multiplicity of water storage reservoirs for installation at remote locations, each for storing water at an elevated pressure above atmosphere yet below the pressure level requiring governmental certification and inspection of pressure vessels, a dispensing system for each storage reservoir for delivering water from the storage reservoir to a convenient dispensing point, a mobile water source for re-supplying pressurized potable water to each storage reservoir once installed at a remote location, wherein the pressurization of water in each storage reservoir enables delivery of water from the storage reservoir to the dispensing point, thereby eliminating the need for a separate power source at each storage reservoir to dispense the water, and an ozone source mobile with the water source for sanitizing the pressurized water by injecting ozone into the water prior to delivery of the water to each storage reservoir, wherein a single ozone generator and water pump can be carried on a mobile unit and utilized to re-supply sanitized water to the storage reservoirs on a periodic basis.

10. The system of claim 9 wherein, each storage reservoir is substantially spherical, so that the storage reservoirs can be made from a material having less strength than would be required for a non-spherical shape, yet still retain sufficient structural strength to withstand 15 psi pressure within the storage reservoirs.

11. The system of claim 9 wherein, the friction losses in the dispensing system for each storage reservoir are negligible.

12. The system of claim 11 wherein, the dispensing system for each storage reservoir includes a supply line that does not have any sharp elbows or restrictions creating significant friction loss.

* * * * *